United States Patent
Fukuzawa et al.

(10) Patent No.: US 8,489,017 B2
(45) Date of Patent: Jul. 16, 2013

(54) WIRELESS COMMUNICATION SYSTEM, WIRELESS COMMUNICATION METHOD, RELAY DEVICE, AND WIRELESS TERMINAL DEVICE

(75) Inventors: Shoji Fukuzawa, Osaka (JP); Yoshiyuki Tanaka, Osaka (JP)

(73) Assignee: Icom Incorporated, Osaka (JP)

( * ) Notice: Subject to any disclaimer, the term of this patent is extended or adjusted under 35 U.S.C. 154(b) by 233 days.

(21) Appl. No.: 13/121,933

(22) PCT Filed: Oct. 28, 2009

(86) PCT No.: PCT/JP2009/068539
§ 371 (c)(1),
(2), (4) Date: Mar. 30, 2011

(87) PCT Pub. No.: WO2010/050535
PCT Pub. Date: May 6, 2010

(65) Prior Publication Data
US 2011/0189945 A1    Aug. 4, 2011

(30) Foreign Application Priority Data
Oct. 28, 2008  (JP) .................. 2008-277521

(51) Int. Cl.
*H04B 7/26*     (2006.01)
(52) U.S. Cl.
USPC ......... 455/7; 455/8; 455/9; 455/10; 455/11.1; 455/12.1; 370/315; 370/316; 370/317; 370/318; 370/319

(58) Field of Classification Search
USPC .............. 455/7–25, 419–420; 370/315–320
See application file for complete search history.

(56) References Cited

U.S. PATENT DOCUMENTS 7,990,904 B2 * 8/2011 Proctor et al. ............... 370/315
2011/0312269 A1 * 12/2011 Judd et al. ................... 455/11.1

FOREIGN PATENT DOCUMENTS

| JP | 09-205495 | 8/1997 |
| JP | 11-225207 | 8/1999 |
| JP | 2002-044751 | 2/2002 |
| JP | 2007-036488 | 2/2007 |
| JP | 2007-300286 | 11/2007 |

* cited by examiner

*Primary Examiner* — Fayyaz Alam
(74) *Attorney, Agent, or Firm* — Baker & McKenzie, LLP

(57) ABSTRACT

There is provided a wireless communication system which causes a wireless terminal to select a relay device among plural relay devices connected together via a communication line when the wireless terminal attempts to communicate with another wireless terminal. The relay device has an information acquiring unit, a calling determining unit, and an information adding unit. The wireless terminal has an information analyzing unit which analyzes whether or not the own device is included in a communication counterparty of calling information when the calling information is included in communication information, a priority comparing unit which determines whether or not a priority level of the calling information is higher than that of a current communication when the own device is included, and a channel changing unit which changes a channel to that of another relay device of the calling information when the priority level of the calling information is higher.

7 Claims, 7 Drawing Sheets

WIRELESS COMMUNICATION SYSTEM, WIRELESS COMMUNICATION METHOD, RELAY DEVICE, AND WIRELESS TERMINAL DEVICE

RELATED APPLICATION

This application is based on Japanese Patent Application No. 2008-277521 filed on Oct. 28, 2008. The specification, claims, and drawings of this application are entirely incorporated herein by reference in this specification.

TECHNICAL FIELD

The present invention relates to a wireless communication system, a wireless communication method, a relay device and a wireless terminal device. More particularly, the present invention relates to control procedures when an arbitrary wireless terminal device communicates with another wireless terminal device via at least one relay device among plural relay devices through a communication channel thereof.

BACKGROUND ART

In recent days, communication traffic relayed by a relay device like a repeater increases with significant increase of the number of wireless terminal devices. Accordingly, there is proposed a distributed trunking wireless communication system which causes a wireless terminal device to select at least one relay device among plural relay devices which are connected together via predetermined communication lines when the wireless terminal device communicates with another wireless terminal device. In such trunking wireless communication system, each wireless terminal device calls through a channel of a repeater to establish a communication path with a communication-counterparty wireless terminal device. The repeater notifies information indicating whether a current channel is busy or idle through a frame which is a unit of wireless signal to wireless terminal devices in an area. Conventionally, several trunking wireless communication systems have been proposed.

For example, in Patent Literature 1, a dispatcher of a trunking wireless communication system (a trunk wireless system) functions as a management center for plural wireless terminal devices. According to Patent Literature 1, when the dispatcher is registered in a base station, the base station relays a communication between wireless terminal devices via the dispatcher, so that the dispatcher enables a simultaneous multicasting communication to each wireless terminal device, and enables an allocation of another wireless terminal device instead of a faulty wireless terminal device.

Patent Literature 1: Unexamined Japanese Patent Application KOKAI Publication No. 2007-36488

DISCLOSURE OF INVENTION

Problem to be Solved by the Invention

In general, in companies and public institutions, an organization and an instruction system thereof are hierarchic, so that such situation is common on a daily basis that a wireless terminal device at an upper hierarchy calls plural wireless terminal devices at a lower hierarchy to communicate or to perform simultaneous multicasting communication. However, in foregoing Patent Literature 1, for example, when equal to two or more wireless terminal devices at the lower hierarchy are communicating with each other through a communication channel of a repeater, the other wireless terminal device at the upper hierarchy cannot call those wireless terminal devices currently in communication through another communication channel to communicate with those devices or to do simultaneous multicasting communication. Moreover, in a trunking wireless communication system without dedicated control channel, a wireless terminal device moves a communication channel based on information included in a downlink signal from a home repeater which is registered beforehand, and the wireless terminal device cannot respond to another call when in communication through a communication channel other than that of the home repeater, so that a user of the wireless terminal device misses hearing an important informative matter, etc., when a call particularly with a higher priority level is made.

The present invention has been made in order to overcome the foregoing problem, and it is an object of the present invention to provide a wireless communication system, a wireless communication method, a relay device and a wireless terminal device in which when equal to two or more wireless terminal devices are communicating with each other through a channel of a relay device, a communication and a simultaneous multicasting communication to the communicating terminal devices can be carried out through another channel.

Means for Solving the Problem

To achieve the foregoing object, a wireless communication system according to a first aspect of the present invention causes a wireless terminal device to select a relay device among plural relay devices connected together via a predetermined communication line when the wireless terminal device attempts to communicate with another wireless terminal device, and the plural relay devices each comprises information acquiring means which acquires, via the communication line, information indicating whether or not another relay device is in communication, and when another relay device is in communication, identification information of a wireless terminal device currently in communication with another relay device, identification information of another relay device, and calling information indicating the presence/absence of a calling from the wireless terminal device currently in communication with another relay device, calling determining means which determines whether or not an arbitrary wireless terminal device currently in communication with a own device is included in a communication counterparty associated with calling information when the calling information indicating a calling is acquired by the information acquiring means with the own device and the wireless terminal device being currently communicating with each other, and information adding means which adds the identification information of the wireless terminal device currently in communication with another relay device, the identification information of another relay device, and the calling information to communication information to be transmitted to the wireless terminal device currently in communication with the own device when the calling determining means determines that the wireless terminal device currently in communication with the own device is included in the communication counterparty, a wireless terminal device currently in communication with a relay device to be selected comprises information analyzing means which analyzes whether or not a own device is included in the communication counterparty associated with the calling information when the calling information is included in communication information received from the relay device, priority comparing means which compares and determines whether or not a priority level of the calling information is higher than a priority level of a current communication when the information analyzing means analyzes that the own device is included in the communication counterparty, and channel changing means which changes a channel to a channel of the identification information of another relay device associated with the calling information when the priority comparing means determines that the priority level of the calling information is higher than the priority level of the current communication.

The wireless communication system according to the first aspect is characterized in that, for example, the priority comparing means compares whether or not the priority level of the calling information is higher than the priority level of the current communication based on the identification information of the wireless terminal device currently in communication with another relay device included in the communication information. Moreover, the wireless communication system according to the first aspect is characterized in that, for example, pieces of information on the priority levels compared with each other by the priority comparing means are stored in predetermined storing means beforehand.

To achieve the foregoing object, a wireless communication method according to a second aspect of the present invention causes a wireless terminal device to select a relay device among plural relay devices connected together via a predetermined communication line when the wireless terminal device attempts to communicate with another wireless terminal device, and the plural relay devices each acquires, via the communication line, information indicating whether or not another relay device is in communication, and when another relay device is in communication, identification information of a wireless terminal device currently in communication with another relay device, identification information of another relay device, and calling information indicating the presence/absence of a calling from the wireless terminal device currently in communication with another relay device, determines whether or not an arbitrary wireless terminal device currently in communication with a own device is included in a communication counterparty associated with calling information when the calling information indicating a calling is acquired with the own device and the wireless terminal device being currently communicating with each other, and adds the identification information of the wireless terminal device currently in communication with another relay device, the identification information of another relay device, and the calling information to communication information to be transmitted to the wireless terminal device currently in communication with the own device when it is determined that the wireless terminal device currently in communication with the own device is included in the communication counterparty, and a wireless terminal device currently in communication with a relay device to be selected analyzes whether or not a own device is included in the communication counterparty associated with the calling information when the calling information is included in communication information received from the relay device, compares and determines whether or not a priority level of the calling information is higher than a priority level of a current communication when it is analyzed that the own device is included in the communication counterparty, and changes a channel to a channel of the identification information of another relay device associated with the calling information when it is determined that the priority level of the calling information is higher than the priority level of the current communication.

The wireless communication method according to the second aspect is characterized in that, for example, it is compared whether or not the priority level of the calling information is higher than the priority level of the current communication based on the identification information of the wireless terminal device currently in communication with another relay device included in the communication information. Moreover, the wireless communication method according to the second aspect is characterized in that, for example, pieces of information on the priority levels compared with each other are stored in predetermined storing means beforehand.

To achieve the foregoing object, a relay device according to a third aspect of the present invention performs relaying and is selected by a wireless terminal device among plural relay devices connected together via a predetermined communication line when the wireless terminal device attempts to communicate with another wireless terminal device, and comprises information acquiring means which acquires, via the communication line, information indicating whether or not another relay device is in communication, and when another relay device is in communication, identification information of a wireless terminal device currently in communication with another relay device, identification information of another relay device and calling information indicating the presence/absence of a calling from the wireless terminal device currently in communication with another relay device, calling determining means which determines whether or not an arbitrary wireless terminal device currently in communication with a own device is included in a communication counterparty associated with calling information when the calling information indicating a calling is acquired by the information acquiring means with the own device and the wireless terminal device being currently communicating with each other, and information adding means which adds the identification information of the wireless terminal device currently in communication with another relay device, the identification information of another relay device, and the calling information to communication information to be transmitted to the wireless terminal device currently in communication with the own device when the calling determining means determines that the wireless terminal device currently in communication with the own device is included in the communication counterparty.

To achieve the foregoing object, a wireless terminal device according to a fourth aspect of the present invention selects a relay device among plural relay devices connected together via a predetermined communication line to communicate with another wireless terminal device, and comprises information analyzing means which analyzes whether or not a own device is included in a communication counterparty associated with calling information when communication information received from a relay device to be selected includes identification information of a wireless terminal device currently in communication with another relay device, identification information of another relay device, and calling information indicating a calling from the wireless terminal device currently in communication with another relay device, priority comparing means which compares and determines whether or not a priority level of the calling information is higher than a priority level of a current communication when the information analyzing means analyzes that the own device is included in the communication counterparty, and channel changing means which changes a channel to a channel of the identification information of another relay device associated with the calling information when the priority comparing means determines that the priority level of the calling information is higher than the priority level of the current communication.

The wireless terminal device according to the fourth aspect is characterized in that, for example, the priority comparing means compares whether or not the priority level of the calling information is higher than the priority level of the current communication based on the identification information of the wireless terminal device currently in communication with another relay device included in the communication information.

Moreover, the wireless terminal device according to the fourth aspect is characterized in that pieces of information on the priority levels compared with each other by the priority comparing means is stored in predetermined storing means beforehand.

Effect of the Invention

According to the present invention, it becomes possible that when equal to two or more wireless terminal devices are communicating with each other through a channel of a relay device, a communication and a simultaneous multicasting communication to the communicating terminal devices can be carried out through another channel.

BEST MODE FOR CARRYING OUT THE INVENTION

An explanation will be given of an embodiment of a wireless communication system, a wireless communication method, a relay device and a wireless terminal device according to the present invention with reference to the accompanying drawings.

Figure 1:
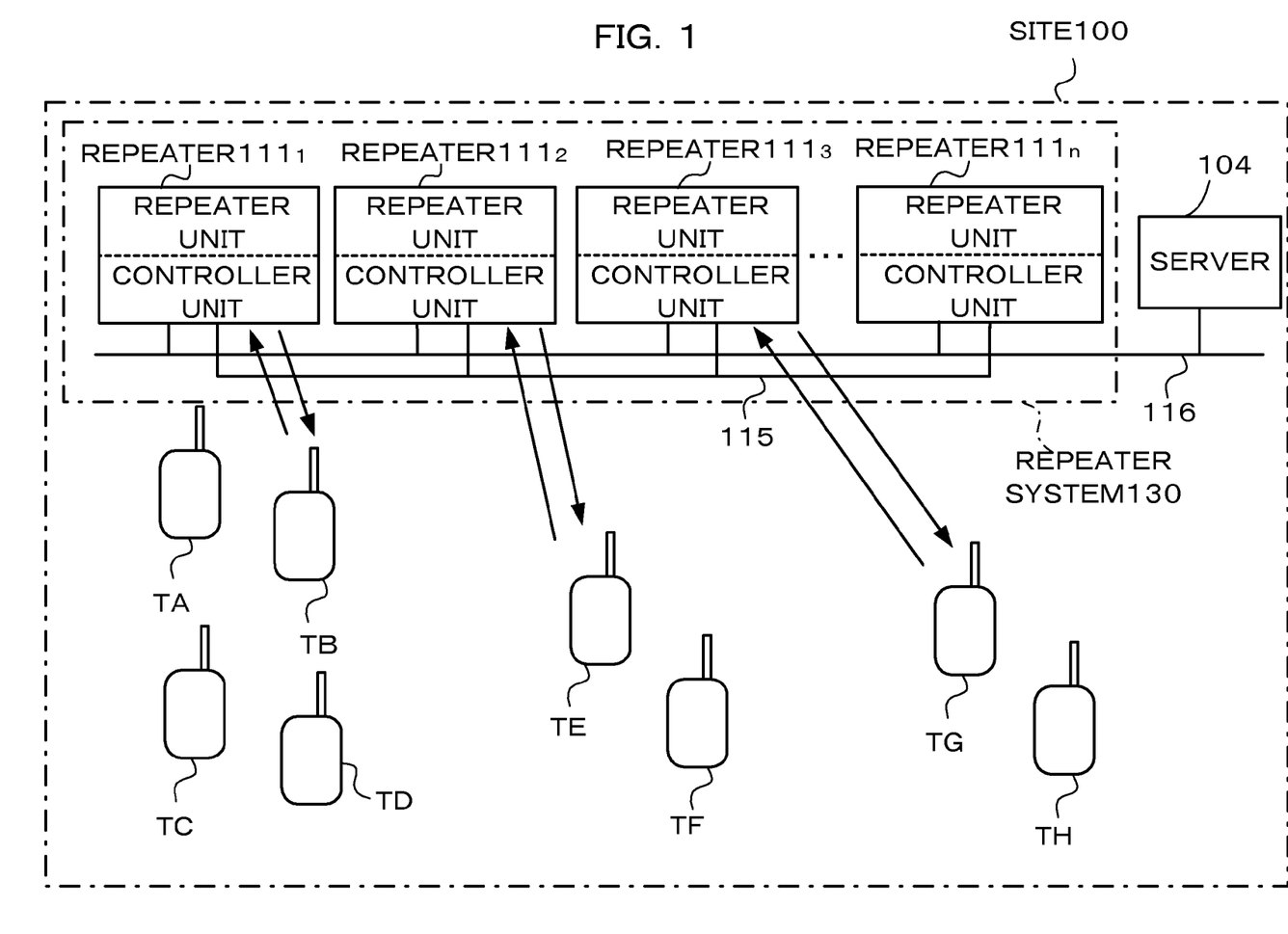
FIG. 1 is a diagram showing a configuration of a wireless communication system according to an embodiment of the present invention.

As shown in FIG. 1, a site 100 of the wireless communication system of the present embodiment has plural (e.g., thirty units at maximum) repeaters $111_1$ to $111_n$ connected together via a communication line 115. Unique relaying channels are respectively allocated to the plural repeaters $111_1$ to $111_n$, and those repeaters bear relaying processes in the same communication area. The plural repeaters $111_1$ to $111_n$ connected together via the communication line 115 configure a repeater system (a relay system) 130. That is, a communication area with the n number of channels (where n is the number of repeaters) is configured by the repeater system 130. Moreover, the repeater system 130 configured by the plural repeaters $111_1$ to $111_n$ is connected to a server 104 via a communication line 116 like an IP connection line. In general, the communication line 115 is called a "system bus", so that the communication line 115 is called the system bus in the following explanation.

The server 104 can perform various settings of the plural repeaters $111_1$ to $111_n$ through remote operation. Each of the repeaters $111_1$ to $111_n$ has a repeater unit and a controller unit. Moreover, information on each of the repeaters $111_1$ to $111_n$ (e.g., whether or not such repeater is currently relaying) is exchanged and shared via the system bus 115. At which time slot data is transmitted is set beforehand in each of the repeaters $111_1$ to $111_n$. Accordingly, each of the repeaters $111_1$ to $111_n$ transmits data at a time slot set beforehand.

Among the plural repeaters $111_1$ to $111_n$, one of such repeaters is set as a "master repeater". An explanation will now be given of a case in which the repeater $111_1$ is the master repeater among the repeaters $111_1$ to $111_n$ shown in FIG. 1. The master repeater transmits a synchronization signal to the system bus 115 for establishing synchronization among the repeater $111_1$ to $111_n$ including the master repeater itself.

Wireless terminal devices TA to TH each registers any one of the repeater among the repeaters $111_1$ to $111_n$ as a home repeater. Each of the wireless terminal devices TA to TH receives a downlink signal of a home repeater in a standby mode. Each of the wireless terminal devices TA to TH acquires idle channel information inserted in the downlink signal of the home repeater, and shifts a channel frequency to that of the idle channel to communicate with another wireless terminal device. After the communication ends, the wireless terminal device returns the channel frequency to the channel frequency of the home repeater, and returns to a standby mode. In FIG. 1, the wireless terminal devices TA to TD register the repeater $111_1$ as a home repeater, the wireless terminal devices TE and TF register the repeater $111_2$ as a home repeater, and the wireless terminal devices TG and TH register the repeater $111_3$ as a home repeater.

The wireless communication system in FIG. 1 is a distributed trunking system in which the wireless terminal devices TA to TH share the plural repeaters $111_1$ to $111_n$, and each of these wireless terminal devices selects at least one repeater as needed for replaying among those repeaters. Such distributed trunking system has no dedicated control channel, and thus all channels serve as control channels and communication channels. For example, it is assumed that the wireless terminal device TA communicates with other wireless terminal devices TB to TD which are registered in the same home repeater. In this case, the wireless terminal device TA acquires channel information which is included in a downlink signal from the repeater $111_1$ that is the own home repeater and which indicates channels enabling a communication, determines channels enabling a communication based on the acquired channel information, selects one of the determined channels enabling a communication (e.g., a channel of the repeater $111_3$), and shifts its own channel frequency to that of the selected channel.

Moreover, the wireless terminal device TA transmits a request for communication permission to this channel (the repeater $111_3$), receives a response to the effect that a communication is permitted from the repeater $111_3$ supplying this channel, and establish a link. Each of the wireless terminal devices TB to TD that are respective communication counterparties receives a control signal which is transmitted from the home repeater $111_1$ and which instructs moving to a communication channel (the channel of the repeater $111_3$) where the wireless terminal device TA has established the link, changes a channel frequency to a channel frequency for the instructed channel, and communicates with the wireless terminal device TA. That is, the repeater $111_1$ operates as a control channel for the wireless terminal devices TA to TD which register the repeater $111_1$ as the home repeater, and operates as a communication channel for other wireless terminal devices TE to TH. Examples of communications among the wireless terminal devices TA to TD are a group communication across the whole wireless terminal devices TA to TD, and with the unit of such group being further divided, a group communication in a small group configured by the wireless terminal devices TA and TB or an individual calling (called an "Individual Call") with one wireless terminal device being targeted.

Figure 2:
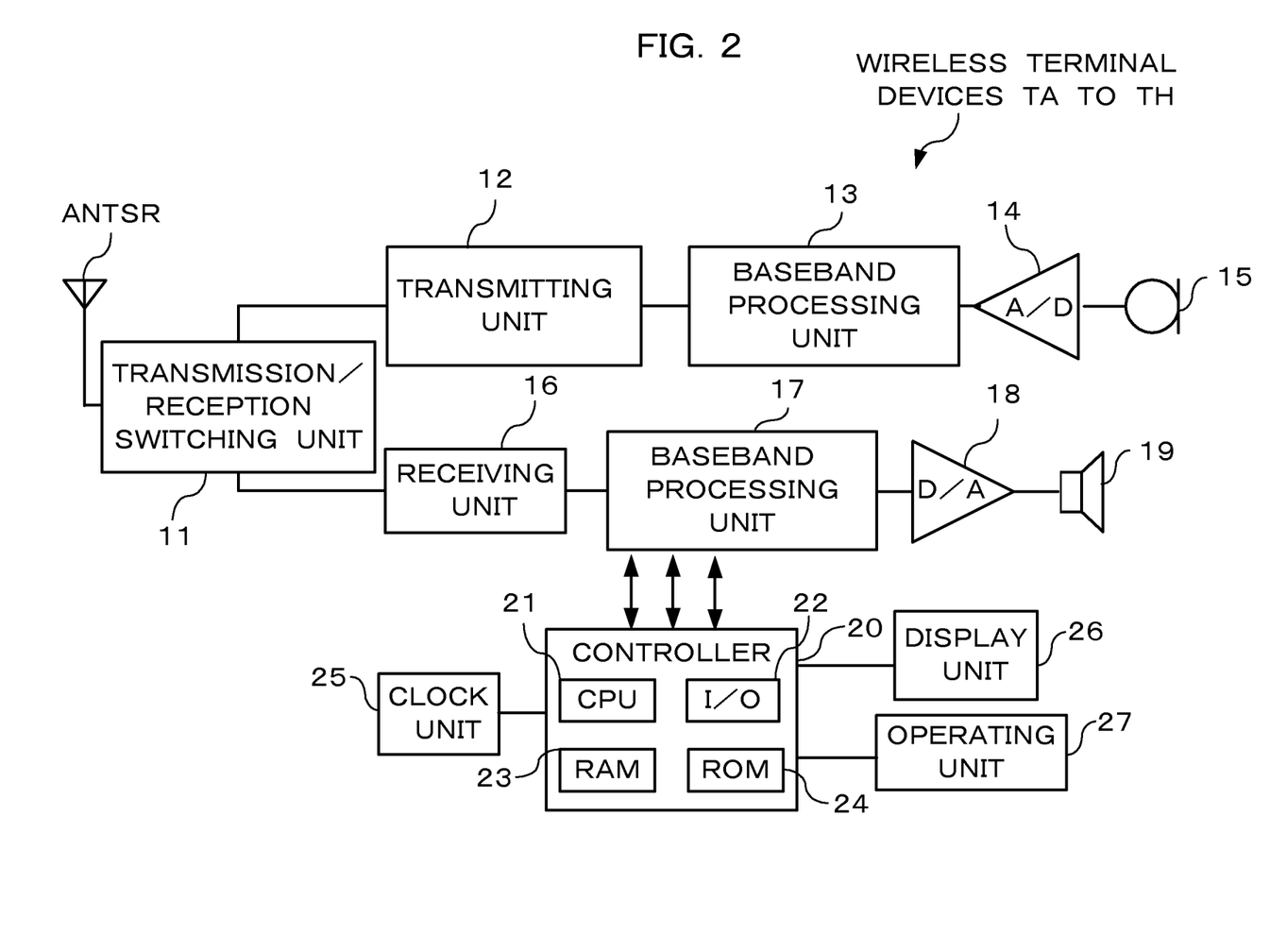
FIG. 2 is a block diagram showing a configuration of a wireless terminal device shown in FIG. 1.
Figure 3:
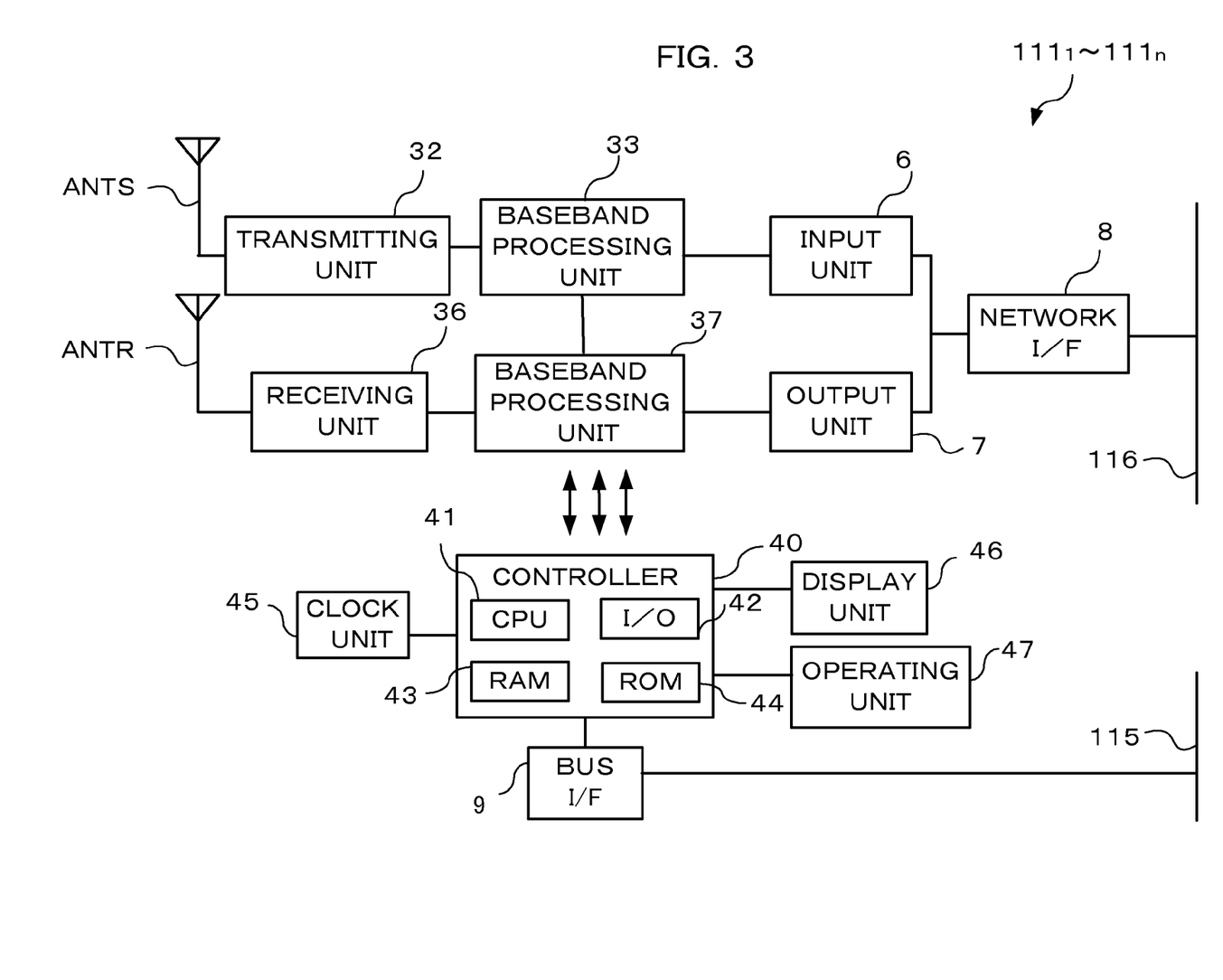
FIG. 3 is a block diagram showing a configuration of a repeater shown in FIG. 1.
Figure 4:
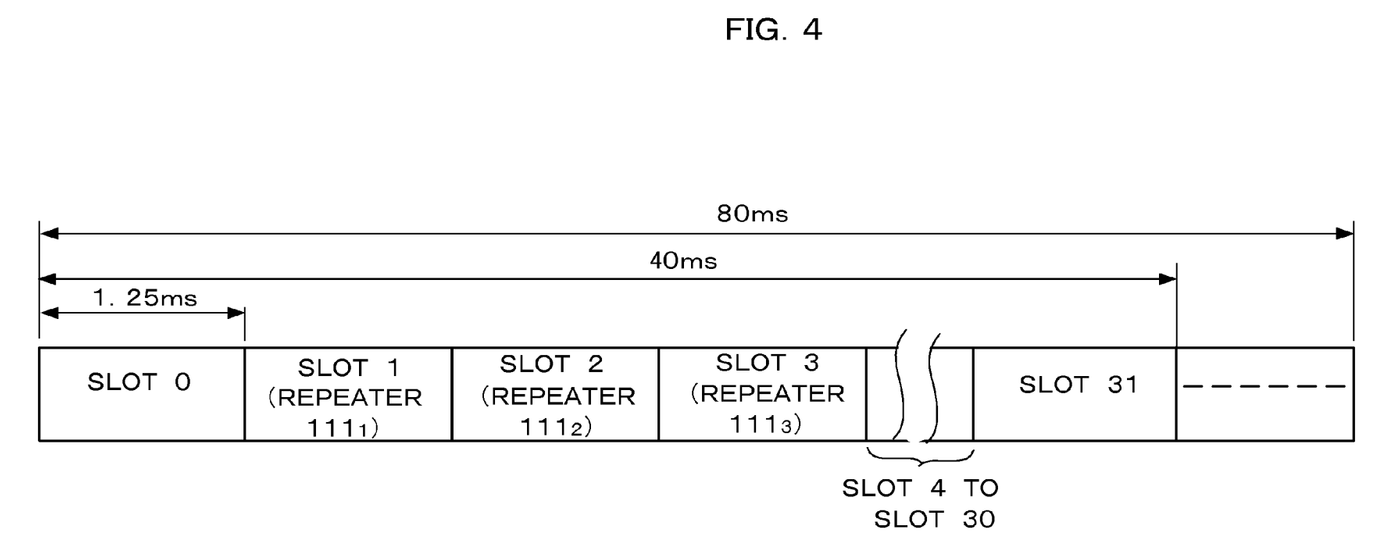
FIG. 4 is a diagram showing a synchronization signal transmitted to a communication line shown in FIG. 1 and including a time slot which follows the synchronization signal and which is allocated to each repeater.
Figure 5:
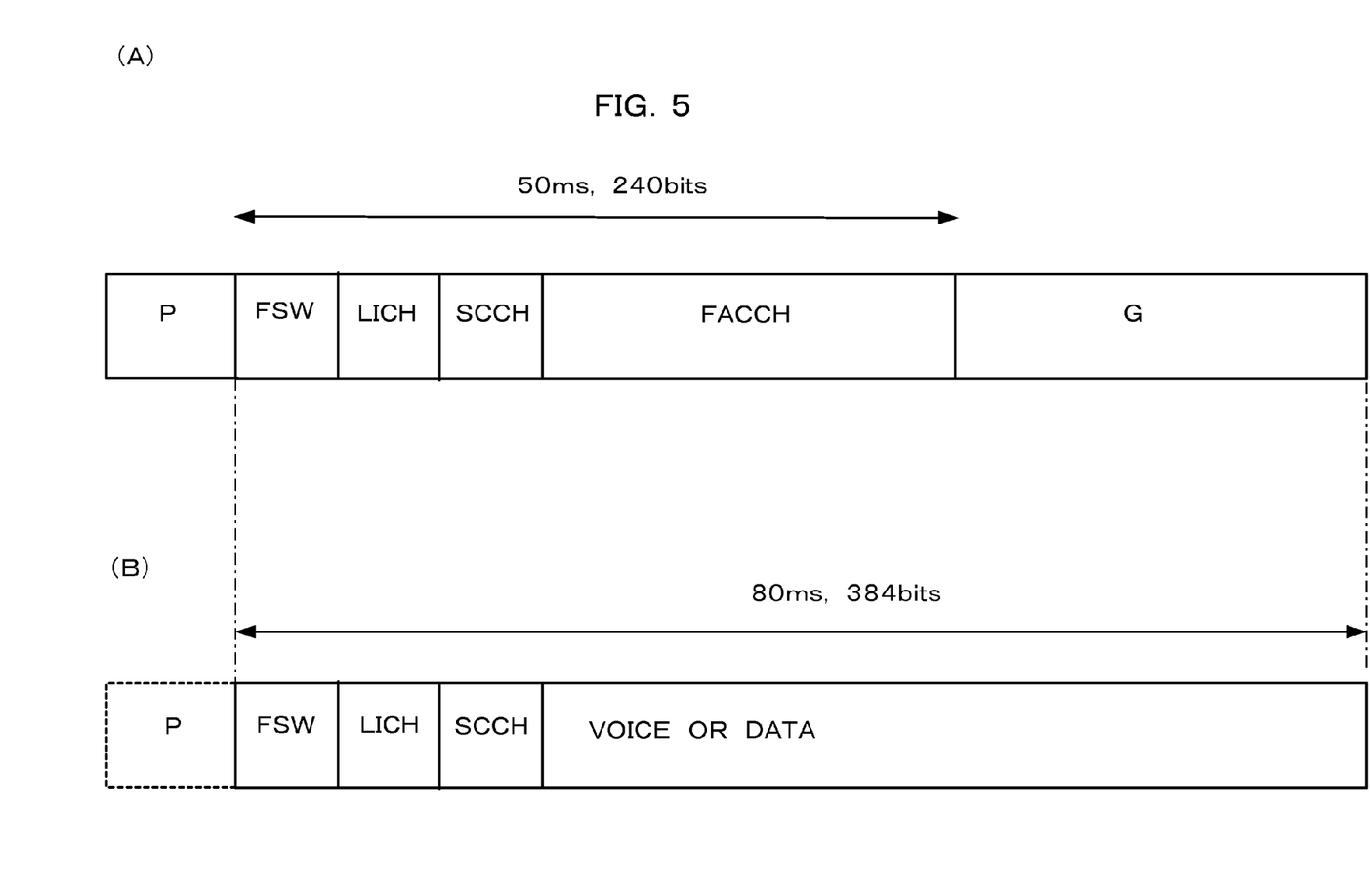
FIG. 5 is a diagram showing a format of a communication frame which is exchanged between the wireless terminal device and the repeater shown in FIG. 1.

Next, with respect to each of the wireless terminal devices TA to TH and each of the repeaters $111_1$ to $111_n$, an explanation will be given of a configuration and a function. FIG. 2 is a block diagram showing a configuration of each of the wireless terminal devices TA to TH in FIG. 1. FIG. 3 is a block diagram showing a configuration of each of the repeaters $111_1$ to $111_n$ in FIG. 1. FIG. 4 is a diagram showing a synchronization signal transmitted from the master repeater $111_1$ to the system bus 115 and a time slot which follows the synchronization signal and which is allocated to each repeater. FIGS. 5A and 5B are diagrams each showing a format of a communication frame exchanged between the repeater and the wireless terminal device. The communication frame has a header part and a data part. Contents of the header part and that of the data part will be discussed later in detail.

As shown in FIG. 2, as blocks of a signaling system, each of the wireless terminal devices TA to TH includes an antenna ANTSR, a transmission/reception switching unit 11, a transmitting unit 12, a baseband processing unit 13, an A/D converter 14, a microphone 15, a receiving unit 16, a baseband processing unit 17, a D/A converter 18, and a speaker 19. Moreover, as blocks of a control system, each of the wireless terminal devices TA to TH further includes a controller 20, a clock unit 25, a display unit 26, and an operating unit 27. Furthermore, the controller 20 has a CPU (central processing unit) 21, an I/O (input/output unit) 22, a RAM (random access memory) 23, a ROM (read-only memory) 24, and an internal bus which connects those together.

The blocks of the signaling system of each of the wireless terminal devices TA to TH is controlled by the CPU 21. The CPU 21 runs a control program stored in the ROM 24 to control the whole wireless terminal device, processes commands and data input from the operating unit 27 via the I/O 22, and data acquired from the baseband processing unit 17, and temporarily stores such data in the RAM 23. Moreover, the CPU 21 displays commands and data both stored as needed on the display unit 26 configured by an LCD (Liquid Crystal Display) or the like. Furthermore, the CPU 21 displays a current time of day acquired from the clock unit 25 on the display unit 26. Note that the controller 20 may employ a structure such that a rewritable nonvolatile memory card like a flash memory which records identification information unique to the wireless terminal device is detachably attached.

Next, with respect to the blocks of the signaling system, the transmission/reception switching unit 11 has an input end connected to the antenna ANTSR, and has an output end to be alternatively connected to the transmitting unit 12 and the receiving unit 16 under the control of the CPU 21. When no transmission operation is performed through the operating unit 27, a own wireless terminal device is in a receiving (standby) mode, and the output end of the transmission/reception switching unit 11 is connected to the receiving unit 16. Conversely, when a transmission operation is made through the operating unit 27, the own wireless terminal device becomes in a transmitting mode, and the output end of the transmission/reception switching unit 11 is connected to the transmitting unit 12.

When each of the wireless terminal devices TA to TH is in the transmitting mode, the microphone 15 converts an audio input given by a user into an analog voice signal and outputs it to the A/D conversion unit 14.

The A/D converter 14 converts the analog audio signal from the microphone 15 into a digital voice signal and outputs it to the baseband processing unit 13.

The baseband processing unit 13 generates a communication frame (a baseband signal) in a predetermined format based on the digital voice signal from the A/D conversion unit 14, or based on data stored in the RAM 23 of the controller 20, and outputs such communication frame to the transmitting unit 12.

The transmitting unit 12 modulates a carrier wave using the communication frame from the baseband processing unit 13, and transmits the modulated carrier wave to a repeater currently performing relaying operation via the transmission/reception switching unit 11 and the antenna ANTSR. GMSK (Gaussian filtered Minimum Shift Keying), PSK (Phase Shift Keying), QAM (Quadrature Amplitude Modulation), FSK (Frequency Shift Keying), etc., is used as the modulation scheme of the transmitting unit 12.

When each of the wireless terminal devices TA to TH is in the receiving mode, the transmission/reception switching unit 11 connects the antenna ANTSR and the receiving unit 16 together. The receiving unit 16 receives respective wireless signals from the repeaters $111_1$ to $111_n$ via the antenna ANTSR. The receiving unit 16 amplifies the received signal, performs a signal process, e.g., a demodulation process on the received signal, and outputs such demodulated signal to the baseband processing unit 17.

The baseband processing unit 17 extracts a communication frame from the demodulated signal output by the receiving unit 16. Moreover, the baseband processing unit 17 outputs information on a header H of the extracted communication frame to the CPU 21. The CPU 21 analyzes the information on the header H, and when a transmission destination of that received signal is a own station, the CPU 21 outputs data of an voice signal included in data D through the D/A converter 18, temporarily stores data other than the voice signal included in the data D in the RAM 23 and displays such data as needed on the display unit 26. The D/A converter 18 converts the voice signal from the baseband processing unit 17 from the digital voice signal into an analog voice signal, and causes the speaker 19 to generate sounds corresponding to such voice signal.

As shown in FIG. 3, as the blocks of a signaling system, each of the repeaters $111_1$ to $111_n$ includes an antenna ANTS for transmission only, a transmitting unit 32, a baseband processing unit 33, an antenna ANTR for reception only, a receiving unit 36, a baseband processing unit 37, an input unit 6, an output unit 7, and a network I/F (interface) 8. Moreover, as blocks of a control system, each repeater includes a controller 40, a clock unit 45, a display unit 46, and an operating unit 47. Furthermore, the controller 40 has a CPU (central processing unit) 41, an I/O (input/output unit) 42, a RAM (random access memory) 43, a ROM (read-only memory) 44, and an internal bus (not illustrated) which connects those together. Moreover, the ROM 44 stores a trouble handling program when a master repeater breaks down and becomes not to output a synchronization signal over the system bus 115 together with a normal operation of the CPU 21.

Furthermore, each of the repeaters $111_1$ to $111_n$ includes a bus I/F (interface) 9 for transmitting information on a own device to the system bus 115 to be discussed later and acquiring information from another repeater. Moreover, the ROM 44 registers a reference value of an elapsed time until it is determined that a own repeater operates as a master repeater.

Each of the repeater $111_1$ to $111_n$ (e.g., the repeater $111_1$) performs signal processes, such as an amplification process and a waveform process, on a radio signal received from a departure wireless terminal device (e.g., the wireless terminal device TA), and transmits such processed signal to a destination wireless terminal device (e.g., the wireless terminal device TB), so that each of the repeaters basically has the same configuration as that of each of the wireless terminal devices TA to TH shown in FIG. 2. Consequently, with respect to the structural elements which are basically same as those of each of the wireless terminal devices TA to TH shown in FIG. 2, the duplicated explanation thereof will be omitted.

When the wireless terminal devices TA to TH communicates with each other via the repeaters $111_1$ to $111_n$, a transmission uplink from the wireless terminal device to the repeater and a transmission downlink from the repeater to the wireless terminal device are communicated at the substantially same time by changing respective frequencies or respective time slots. Consequently, each of the repeater $111_1$ to $111_n$ includes the antenna ANTS for transmission only and the antenna ANTR for reception only. Moreover, as shown in FIG. 1, each of the plural repeaters $111_1$ to $111_n$ is connected together via the system bus 115, and connected to the server 104 via the communication line 116 like the IP connection line.

Under the input control of the CPU 41, the input unit 6 inputs data, etc., transmitted from the server 104 via the network I/F 8, and supplies such data to the baseband processing unit 33.

Moreover, under the input control of the CPU 41, the output unit 7 transmits data supplied from the baseband processing unit 33 to the sever 104 via the network I/F 8.

When such multisite network is configured that a repeater communicates with another repeater in another site which configures a different communication area, the input unit 6 and the output unit 7 further exchange communication frames with another repeater of another site via the network I/F 8. The bus I/F 9 intermediates acquisition of a synchronization signal transmitted by a master repeater to a system bus and repeater information transmitted from another repeater other than a own device to the system bus under the input control of the CPU 41, and intermediates transmission of information on the own device to the system bus under the output control of the CPU 41.

Next, an explanation will now be given of the wireless communication method of the wireless terminal system according to the present embodiment with reference to FIG. 4 and FIG. 6.

A synchronization signal in FIG. 4 has a period of 80 ms, and the first-half 40 ms includes thirty-two slots from a slot 0 to a slot 31. Consequently, each slot has a time length of 1.25 ms. The first slot 0 is a synchronization signal, and is transmitted by a specific repeater, i.e., the master repeater $111_1$ in accordance with a set algorithm, and other repeaters $111_2$ to $111_n$ serve as slave repeaters and acquire the synchronization signal. The repeaters $111_1$ to $111_n$, i.e., the repeater system 130 operates in synchronization with the synchronization signal. Any one of slots from a slot 1 to the slot 31 other than the slot 0 for synchronization is allocated to each of the repeaters $111_1$ to $111_n$. Each of the repeaters $111_1$ to $111_n$ writes information on each shared repeater in a slot which is allocated to a own device. The repeater $111_1$ which is the master repeater transmits the synchronization signal in the slot 0, and writes information on the repeater $111_1$ (e.g., information indicating whether the repeater $111_1$ is currently unused or relaying) in a slot which is allocated to the repeater $111_1$ among the slots from the slot 1 to the slot 31. Note that the last slot 31 is used for connecting external devices for future extensions.

FIG. 5A shows an illustrative format of a communication frame when a link with a communication channel is established, and FIG. 5B shows an illustrative format of a communication frame at the time of voice and data communication. In FIGS. 5A and 5B, the format of each communication frame has a configuration of 80 ms and 386 bits. Moreover, a preamble (P) equal to 24 bits or larger is affixed at the header of the frame at the time of an initial transmission only. FSW is a frame synchronization word, LICH is a link information channel, SCCH is a signaling information channel for trunking control, and G is a guard time.

Next, an explanation will be given of an operation of the wireless communication system with the foregoing configuration.

The explanation will be mainly given of a specific operation of communicating with a wireless terminal device in communication and performing simultaneous multicasting communication through another channel while equal to two or more wireless terminal devices are communicating with each other via a repeater.

In the wireless communication system 100 shown in FIG. 1, when the wireless terminal device TB acquires idle channel information included in a downlink signal from the repeater $111_1$ which is a home repeater, and performs individual calling to the wireless terminal device TA via the repeater $111_2$ which is an idle channel, first, the wireless terminal device TB writes an ID of the repeater $111_2$ which is a communication channel to be used, an ID of the repeater $111_1$ which is a home repeater where the wireless terminal device TA to be a called terminal is registered, etc., in SCCH in the communication frame format shown in FIG. 5A at the time of link establishment, writes the ID of the repeater $111_1$ which is the home repeater where the wireless terminal device TB being a calling terminal is registered, an ID of the wireless terminal device TB being the calling terminal, etc., in FACCH, and transmits such communication frame to the repeater $111_2$ which is the communication channel.

In response to this transmission, the repeater $111_2$ gives back the communication frame which is transmitted from the wireless terminal device TB and in which idle channel information is to be written. After receiving the communication frame which permits a communication from the repeater $111_2$, the wireless terminal device TB inserts the ID of the home repeater where the wireless terminal device TB is registered, the ID of the wireless terminal device TB, etc., in SCCH in the communication frame format shown in FIG. 5B, and subsequently inserts an voice in a case of an voice communication or inserts data in a case of a data communication, and, transmits such communication frame to the repeater $111_2$.

Each repeater acquires information included in a communication frame transmitted from a wireless terminal device, transmits information including other information indicating a status of the own repeater in a slot allocated to the own device, and such pieces of information are shared among the repeaters configuring the site 100. Consequently, the repeater $111_1$ where the wireless terminal device TA being the called terminal is registered can check whether or not the wireless terminal device TB is performing individual calling to the wireless terminal device TA via the repeater $111_2$, so that the repeater $111_1$ inserts an instruction for the wireless terminal device TA to shift a channel frequency to that of the repeater $111_2$ in a communication frame of a downlink signal of the repeater $111_1$.

In a standby mode, a wireless terminal device receives a channel frequency of a downlink signal of a home repeater which registers the own wireless terminal device, the wireless terminal device can shift the channel frequency to that of a communication channel where the wireless terminal device is called. When a group communication is requested, it is appropriate if a group ID is written instead of an ID of the wireless terminal device TA.

In order to realize the above-explained operation, an explanation will now be given of an operation of each repeater with reference to a flowchart in FIG. 6.

Figure 6:
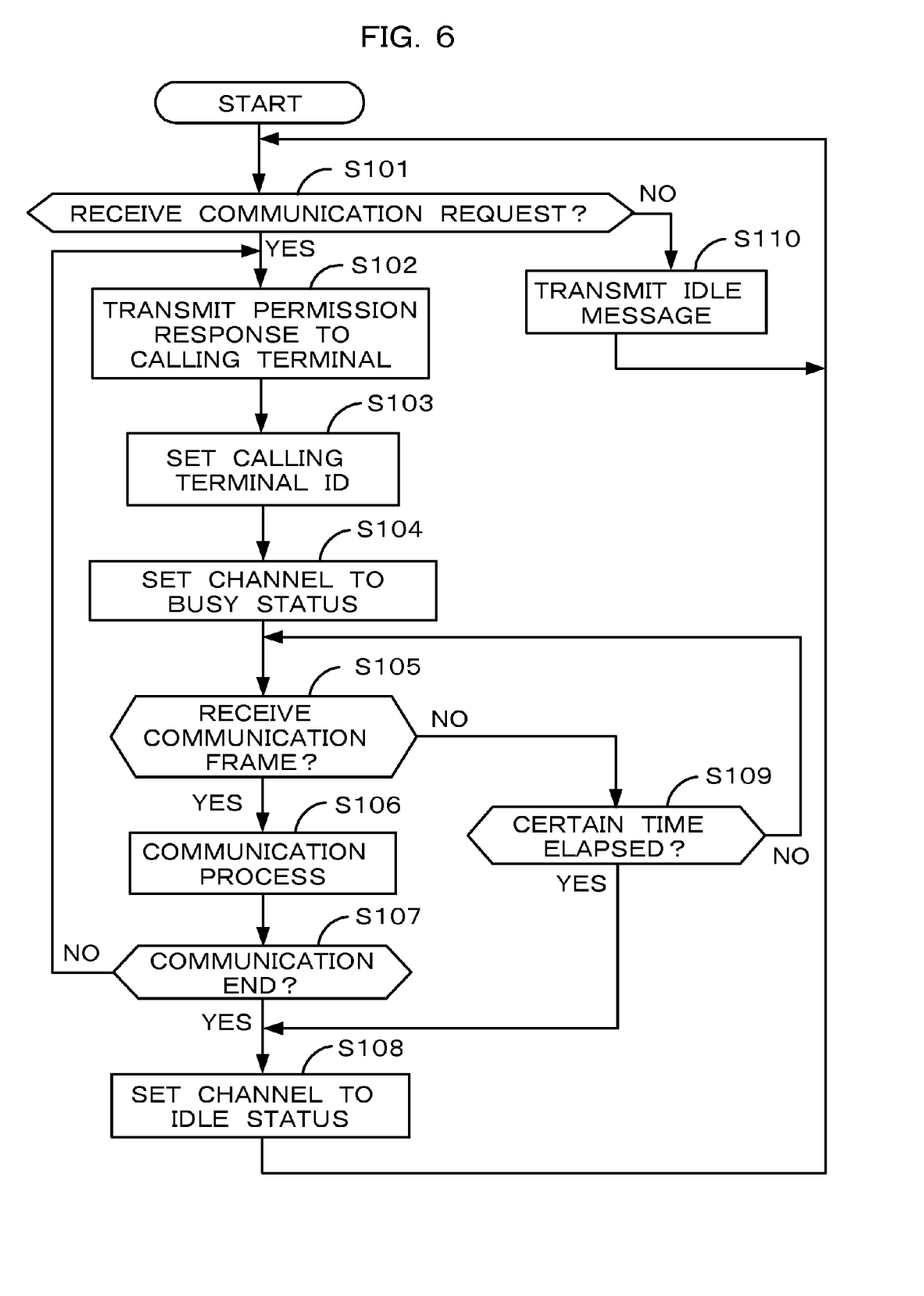
FIG. 6 is a flowchart of a CPU in FIG. 3 representing an operation of each repeater.

After the power is turned on, first, the CPU 41 of each of the repeaters $111_1$ to $111_n$ starts a process shown in FIG. 6, and determines whether or not a communication request is received from any one of the wireless terminal devices (step S101). When the communication request is received, a response to the effect that the use of a channel is permitted is transmitted to a calling terminal (step S102). Moreover, the CPU 41 extracts an ID of the calling terminal, i.e., terminal identification information, an ID of a called wireless terminal device (hereinafter, a "called terminal"), an ID of a home repeater where the calling terminal and the called terminal are registered, etc., from a communication frame of a received calling, stores such information in the RAM 43 (step S103), and changes and sets channel information from an idle status to an busy status (step S104). The information stored in the RAM 43 in the step S103 is transmitted to another repeater by the controller unit 40 via the system bus 115 as will be discussed later. Conversely, when no communication request is received from any wireless terminal devices in the step S101 and when a certain time has elapsed, an Idle message is transmitted (step S110), and the process returns to the step S101.

After the channel information is changed to the busy status in the step S104, when a communication frame for communication is received from the calling terminal (step S105; YES) and when the communication frame is received within a certain receiving standby time even if no communication frame is received from the calling terminal in the step S105, necessary information like idle channel information is added, and a communication process of relaying the communication frame between the calling terminal and the called terminal is executed (step S106). Thereafter, it is determined that whether or not a communication has ended (step S107), and when the communication has ended or when no communication frame is received even after a certain time has elapsed in the step S109, the channel information is changed and set from the busy status to the idle status (step S108).

When there is a response from the called terminal to the calling terminal, the called terminal requests a communication to the repeater 111, so that the above-explained operation is repeated. Note that when a calling of a group communication across a group where a wireless terminal device in communication belongs is performed, in the communication process at the step S106, an ID of the group communication, a channel where the group communication is performed, a repeater ID of a home repeater where a wireless terminal device belonging to the ID of the group communication is registered are added in the communication frame. As will be discussed later, such added information is checked by a wireless terminal device which has received a communication frame for relaying, and the wireless terminal device moves a communication channel as needed so as to participate in the group communication.

As explained above, each repeater can recognize whether or not another channel is an occupied status (including a link establishing status) or an idle status by acquiring information written by another repeater in a slot allocated thereto, so that each repeater transmits (including the transmission of the Idle message in the step S110 in FIG. 6) a communication frame of a downlink signal including information on a repeater which is an idle channel. Consequently, the wireless terminal device can make a call to a channel in the idle status as a communication channel based on channel information received from the home repeater. At this time, the ID of the group communication, the communication channel thereof, the repeater ID of the home repeater where the wireless terminal device belonging to the ID of the group communication is registered can be written in the communication frame for relaying.

For example, in FIG. 1, it is assumed that a calling of a group communication across the wireless terminal devices TA to TD with a higher priority level than that of an individual calling of the wireless terminal device TB to the wireless terminal device TA is performed by the wireless terminal device TC via the repeater $111_3$ (a channel 3) when the wireless terminal device TB is performing individual calling and is communicating with the wireless terminal device TA with the repeater $111_1$ (a channel 1) being as a home repeater via the repeater $111_2$ (a channel 2). In this case, the priority level of calling is set beforehand in the ROM 24 or the like of the wireless terminal device. For example, the priority level can be set in such an order that a group communication across the whole group configured by wireless terminal devices belonging to the same organization or the same public institution is set to be the highest, a group communication in a small group with such whole group being divided is set to be a next hierarchy, and an individual calling with one wireless terminal device being specified is set to be a hierarchy after the next, but the priority level is not limited to this order, and can be set accordingly.

Each of the repeaters $111_1$ to $111_n$ can check whether or not the wireless terminal device TC is performing group calling to the wireless terminal devices TA to TD via the repeater $111_3$ from information transmitted from the repeater $111_3$ via the system bus 115. The repeater $111_2$ which is currently serving as a communication channel between the wireless terminal device TA and the wireless terminal device TB writes an ID of the group communication across the wireless terminal devices TA to TD, an ID of the repeater $111_3$ which is a communication channel where the calling of the group communication is being made, and an ID of a home repeater where the wireless terminal device belonging to the ID of the group communication is registered in an SCCH part of a communication frame of a downlink signal to be transmitted to each of the wireless terminal device TA and the wireless terminal device TB.

Next, an explanation will now be given of an operation of each of the wireless terminal devices TA to TH with reference to a flowchart in FIG. 7.

Figure 7:
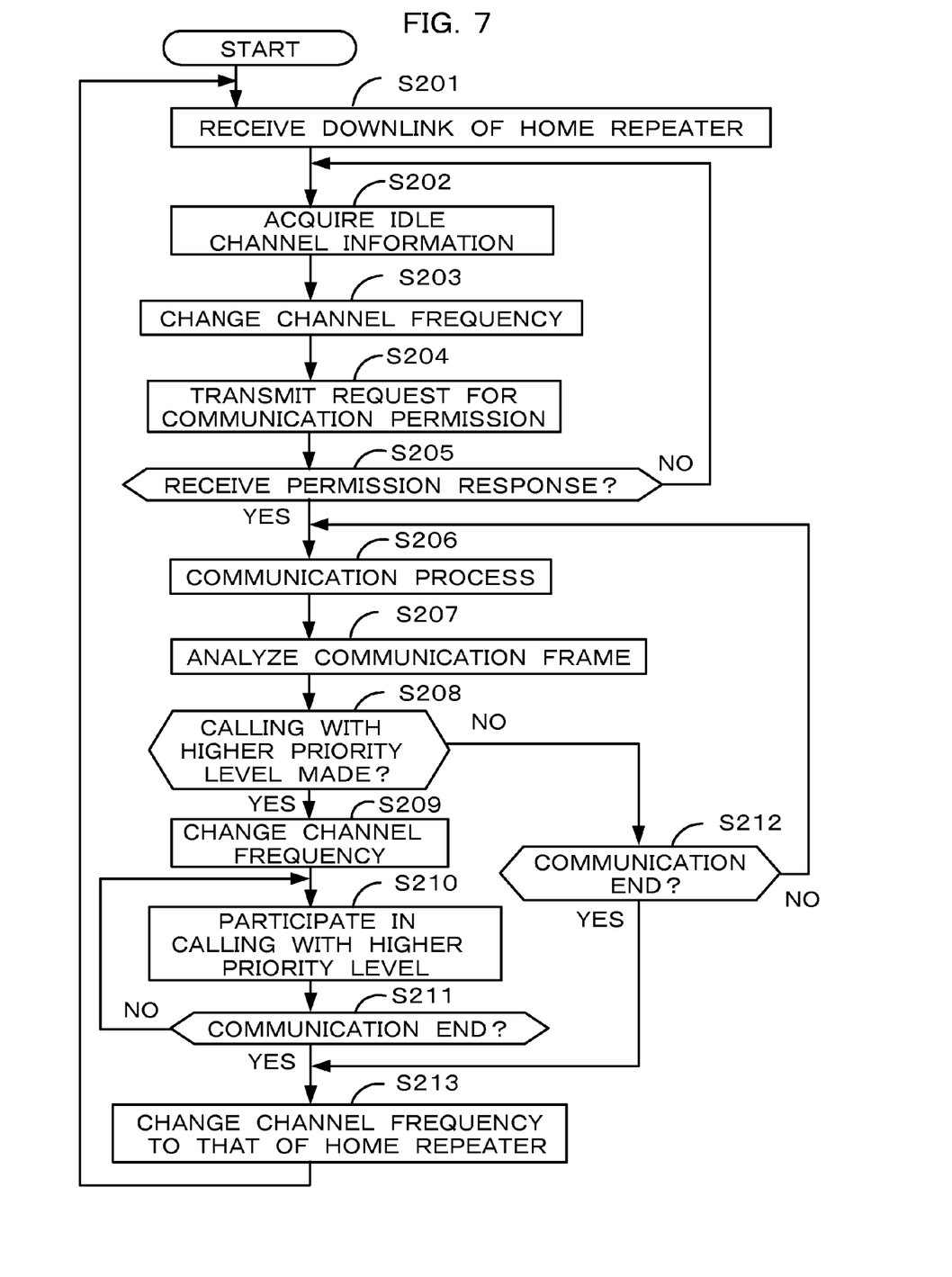
FIG. 7 is a flowchart of a CPU in FIG. 2 representing an operation of the wireless terminal device.

After the power is turned on, the CPU 21 repeats executing a process shown in FIG. 7. In this process, when in a standby mode, a wireless terminal device has a channel frequency set to be that of a home repeater where the own device is registered, and the CPU 21 receives a downlink signal from the home repeater (step S201).

When the wireless communication device attempts a communication with another wireless terminal device, the wireless communication device acquires idle channel information included in the downlink signal from the home repeater (step S202), and a transmission frequency and a reception frequency are both changed to a channel frequency of this idle channel (step S203).

After changing the transmission frequency and the reception frequency, the CPU 21 transmits a communication frame requesting a repeater supplying a communication channel to permit communication so as to start the communication (step S204). When a response to the effect that the communication is permitted is received from the repeater (step S205; YES), a communication process is executed (step S206).

When the repeater which received the communication frame for requesting of the communication permission has already transmitted a response to the effect that a communication is permitted to another wireless terminal device or when another wireless terminal device has already executed a communication process (step S205; NO), the process returns to the step S202, the communication device acquires idle channel information included in a communication frame for the response to the effect that the communication is permitted to another wireless terminal device or included in a communication frame transmitted in the communication process, changes a current channel frequency to a channel frequency of an idle channel, and transmits a communication frame for requesting of a communication permission. The step S202 to the step S205 are repeated until a response to the effect that the communication is permitted is received.

After the communication device receives the response to the effect that the communication is permitted in the step S205, when the communication device executes the communication process in the step S206, a communication frame received via the repeater is analyzed (step S207), and it is checked whether or not a calling with a higher priority level than that of a current communication is being made (step S208). When the communication device determines that the calling with the higher priority level than that of the current communication is being made (step S208; YES), the communication device changes the current channel frequency to a channel frequency of a communication channel where the calling with the higher priority level is being made (step S209), and the own wireless terminal device participates in the calling with the higher priority level (step S210). Thereafter, it is checked whether or not a communication ends (step S211), and when it is determined that the communication has not ended yet, the own wireless terminal device keeps participating in the calling with the higher priority level.

In the step S208, when it is determined that no calling with a higher priority level than that of the current communication is being made (step S208; NO), the CPU 21 analyzes a communication frame received via the repeater and continues the communication while checking whether or not a calling with a higher priority level than that of the current communication is being made.

When the communication by the calling with the higher priority level ends (step S211; YES) or when the current communication ends (step S212; YES), the communication device changes the current channel frequency to a channel frequency of the home repeater, and a downlink signal of the home repeater is received (steps S213, S201).

In this way, according to the foregoing embodiment, the plural repeaters each adds, on a communication frame to be transmitted to the wireless terminal device, channel information indicating whether or not a channel of the own device is in an busy or idle status and, based on information on another repeater acquired via the system bus, information on an ID of a group calling or an individual calling from a wireless terminal device other than a wireless terminal device in communication that is registered in a home repeater where a wireless terminal device taking the own device as a communication channel is registered and information on a communication channel where such calling is being made from, and transmits such added communication frame.

Conversely, when calling information on the ID of the group calling, on that of the individual calling, etc., is contained in the communication frame received from the repeater, if a own device is included in a communication counterparty associated with that calling information, the wireless terminal device compares and determines whether or not a priority level of the calling information is higher than a priority level of a current communication. When the priority level of the calling information is higher than the priority level of the current communication, the wireless terminal device changes a channel frequency to that of an ID of another repeater associated with the calling information.

Consequently, when equal to two or more wireless terminal devices are communicating with each other through a channel of a repeater, a calling with a higher priority level than that of a current communication performed between wireless terminal devices in communication can be made through another channel. For example, in companies and public institutions where an organization and an instruction system thereof are hierarchic, even if equal to two or more wireless terminal devices at a lower hierarchy are communicating with each other through a communication channel of a repeater, another wireless terminal device with a higher priority level at an upper hierarchy can call out the wireless terminal devices in communication through another communication channel to communicate with those devices or to do simultaneous multicasting communication.

In the foregoing embodiment, in FIG. 1, for example, when a group communication in a small group configured by the wireless terminal devices TA and TB is performed, the group communication in the small group configured by the wireless terminal devices TA and TB can be controlled so as not to be output from the respective speakers of the wireless terminal devices TC and TD by a tone squelch function or by a code squelch function. When there is a wireless terminal device belonging to a different organization from an organization of a company or a public institution where the wireless terminal devices TA to TD each registering the repeater $111_1$ as a home repeater belong, like the foregoing group communication in the small group, it is also appropriate if contents of a communication across such wireless terminal devices is controlled so as not to be output from the speaker of another wireless terminal device by the tone squelch function or by the code squelch function.

Note that the foregoing embodiment is provided to give explanations of the present invention, the present invention is not limited to the foregoing embodiment, and other embodiments and modified embodiments which can be thought out by those skilled in the art are also included in the present invention without departing from the scope and the spirit of the present invention.

For example, in the foregoing embodiment, information writing means and information adding means together correspond to a function of a software executed by the CPU 41 of a repeater in FIG. 3. Moreover, interruption determining means, information extracting means, and channel selecting means together correspond to a function of a software executed by the CPU 21 of a wireless terminal device in FIG. 2, and, operating means and storing means correspond to the operating unit 27 and the nonvolatile memory, respectively. However, the scope of the present invention is not limited to the foregoing embodiment, and it is clear that another embodiment realized by hardwares like electronic circuits instead of the function of the CPU 41 of the repeater and the function of the CPU 21 of the wireless terminal device can be employed.

DESCRIPTION OF REFERENCE NUMERALS

TA to TH Wireless terminal device
$111_1$ to $111_n$ Repeater
115 System bus (communication line)
20, 40 Controller
21, 41 CPU
23, 43 RAM

The invention claimed is:

1. A wireless communication system which causes a wireless terminal device to select a relay device among plural relay devices connected together via a predetermined communication line when the wireless terminal device attempts to communicate with another wireless terminal device, wherein the plural relay devices each comprises:
information acquiring means which acquires, via the communication line, information indicating whether or not another relay device is in communication, and when the another relay device is in communication, identification information of a wireless terminal device currently in communication with the another relay device, identification information of the another relay device, and calling information indicating whether or not a calling from the wireless terminal device currently in communication with the another relay device is present;
calling determining means which determines whether or not an arbitrary wireless terminal device currently in communication with the relay device is included in a communication counterparty associated with the calling information when the calling information indicating a calling is acquired by the information acquiring means with the relay device and the wireless terminal device currently communicating with each other; and
information adding means which adds the identification information of the wireless terminal device currently in communication with the another relay device, the identification information of the another relay device, and the calling information to communication information to be transmitted to the wireless terminal device currently in communication with the relay device when the calling determining means determines that the wireless terminal device currently in communication with the relay device is included in the communication counterparty; and
a wireless terminal device currently in communication with a relay device to be selected comprises:
information analyzing means which analyzes whether or not the wireless terminal device is included in the communication counterparty associated with the calling information when the calling information is included in the communication information received from the relay device;
priority comparing means which compares and determines whether or not a priority level of the calling information is higher than a priority level of a current communication when the information analyzing means analyzes that the wireless terminal device is included in the communication counterparty; and
channel changing means which changes a channel to a channel of the identification information of the another relay device associated with the calling information when the priority comparing means determines that the priority level of the calling information is higher than the priority level of the current communication.

2. The wireless communication system according to claim 1, wherein the priority comparing means compares whether or not the priority level of the calling information is higher than the priority level of the current communication based on the identification information of the wireless terminal device currently in communication with the another relay device included in the communication information.

3. The wireless communication system according to claim 1, wherein pieces of information on the priority levels compared with each other by the priority comparing means are stored in predetermined storing means beforehand.

4. A wireless communication method which causes a wireless terminal device to select a relay device among plural relay devices connected together via a predetermined communication line when the wireless terminal device attempts to communicate with another wireless terminal device, wherein the plural relay devices each:
acquires, via the communication line, information indicating whether or not another relay device is in communication, and when the another relay device is in communication, identification information of a wireless terminal device currently in communication with the another relay device, identification information of the another relay device, and calling information indicating whether or not a calling from the wireless terminal device currently in communication with the another relay device is present;
determines whether or not an arbitrary wireless terminal device currently in communication with the relay device is included in a communication counterparty associated with the calling information when the calling information indicating a calling is acquired with the relay device and the wireless terminal device currently communicating with each other; and
adds the identification information of the wireless terminal device currently in communication with the another relay device, the identification information of the another relay device, and the calling information to communication information to be transmitted to the wireless terminal device currently in communication with the relay device when it is determined that the wireless terminal device currently in communication with the relay device is included in the communication counterparty, and
a wireless terminal device currently in communication with a relay device to be selected:
analyzes whether or not the wireless terminal device is included in the communication counterparty associated with the calling information when the calling information is included in communication information received from the relay device;
compares and determines whether or not a priority level of the calling information is higher than a priority level of a current communication when it is analyzed that the wireless terminal device is included in the communication counterparty; and
changes a channel to a channel of the identification information of the another relay device associated with the calling information when it is determined that the priority level of the calling information is higher than the priority level of the current communication.

5. The wireless communication method according to claim 4, wherein it is compared whether or not the priority level of the calling information is higher than the priority level of the current communication based on the identification information of the wireless terminal device currently in communication with the another relay device included in the communication information.

6. A relay device which performs relaying and which is selected by a wireless terminal device among plural relay devices connected together via a predetermined communication line when the wireless terminal device attempts to communicate with another wireless terminal device, the relay device comprising:
   information acquiring means which acquires, via the communication line, information indicating whether or not another relay device is in communication, and when the another relay device is in communication, identification information of a wireless terminal device currently in communication with the another relay device, identification information of the another relay device, and calling information indicating whether or not a calling from the wireless terminal device currently in communication with the another relay device is present;
   calling determining means which determines whether or not an arbitrary wireless terminal device currently in communication with the relay device is included in a communication counterparty associated with the calling information when the calling information indicating a calling is acquired by the information acquiring means with the relay device and the wireless terminal device currently communicating with each other; and
   information adding means which adds the identification information of the wireless terminal device currently in communication with the another relay device, the identification information of the another relay device, and the calling information to communication information to be transmitted to the wireless terminal device currently in communication with the relay device when the calling determining means determines that the wireless terminal device currently in communication with the relay device is included in the communication counterparty.

7. A wireless terminal device which selects a relay device among plural relay devices connected together via a predetermined communication line to communicate with another wireless terminal device, the wireless terminal device comprising:
   information analyzing means which analyzes whether or not a wireless terminal device is included in a communication counterparty associated with calling information when communication information received from a relay device to be selected includes identification information of a wireless terminal device currently in communication with the another relay device, identification information of the another relay device, and the calling information indicating a calling from the wireless terminal device currently in communication with the another relay device;
   priority comparing means which compares and determines whether or not a priority level of the calling information is higher than a priority level of a current communication when the information analyzing means analyzes that the wireless terminal device is included in the communication counterparty; and
   channel changing means which changes a channel to a channel of the identification information of the another relay device associated with the calling information when the priority comparing means determines that the priority level of the calling information is higher than the priority level of the current communication.

\* \* \* \* \*